United States Patent [19]

Fujita et al.

[11] Patent Number: 5,104,838

[45] Date of Patent: Apr. 14, 1992

[54] PRODUCTION OF α-OLEFIN POLYMERS

[75] Inventors: Takashi Fujita; Toshihiko Sugano; Takashi Niwa, all of Yokkaichi, Japan

[73] Assignee: Mitsubishi Petrochemical Company Limited, Tokyo, Japan

[21] Appl. No.: 561,572

[22] Filed: Aug. 2, 1990

[30] Foreign Application Priority Data

Aug. 10, 1989 [JP] Japan .................... 1-207562

[51] Int. Cl.$^5$ .................................. C08F 4/60
[52] U.S. Cl. .............................. 502/108; 502/103; 502/121; 502/125; 502/127; 502/134; 526/119
[58] Field of Search ............... 502/103, 108, 121, 125, 502/127, 134

[56] References Cited

U.S. PATENT DOCUMENTS

| | | | |
|---|---|---|---|
| 4,295,991 | 10/1981 | Wristers | 502/108 |
| 4,442,224 | 4/1984 | Takitani et al. | 502/125 |
| 4,665,047 | 5/1987 | Slaugh et al. | 502/108 |
| 4,701,432 | 10/1987 | Welborn, Jr. | 502/113 |

OTHER PUBLICATIONS

Soga et al., Makromol. Chem., 190, (1989), pp. 31-35.
Transition Metals and Organometallics as Catalysts for Olefin Polymerization, W. Kaminsky H. Sinn (Eds.), Springer-Verlag, Proceedings of an International Symposium, Hamburg (FRG), Sep. 21-24, 1987.

*Primary Examiner*—Patrick P. Garvin
*Assistant Examiner*—Brent M. Peebles

*Attorney, Agent, or Firm*—Oblon, Spivak, McClelland, Maier & Neustadt

[57] ABSTRACT

Disclosed is a titanium-containing solid catalyst component which is a contact reaction product of:

(i) a magnesium halide such as $MgCl_2$, (ii) a titanium compound represented by the formula:

$$Ti(OR^1)_a X_{4-a}$$

wherein a is a number of $0 \leq a \leq 4$, $R^1$ represents a hydrocarbon residue having 1 to 20 carbon atoms, and X represents a halogen atom, such as $Ti(O-n-Bu)_4$, and (iii) a coordination titanium compound represented by the formula:

$$R^2_m R^3_n TiX_{4-m-n}$$

wherein $R^2$ represents a cyclopentadienyl group or a substituted cyclopentadienyl group, $R^3$ represents a hydrogen atom, a hydroxyl group, a hydrocarbyl group having 1 to 20 carbon atoms, an alkoxy group having 1 to 20 carbon atoms, an amino group or a substituted amino group, X represents a halogen atom, and m is a number of $1 \leq m \leq 4$ and n is a number of $0 \leq n \leq 3$, with the proviso that the condition of $1 \leq m+n \leq 4$ is satisfied, such as $Cp_2TiCl_2$, i.e. bis(cyclopentadienyl)titanium dichloride.

Polyolefins of a broader molecular weight distribution will be produced.

9 Claims, No Drawings

PRODUCTION OF α-OLEFIN POLYMERS

BACKGROUND OF THE INVENTION

1. Field of the Art

The present invention relates to a titanium-containing solid catalyst component for polymerization of α-olefins and a catalyst containing this catalyst component.

More particularly, the present invention relates to production of α-olefin polymers wherein it is made possible to obtain a polyolefin having a broad molecular weight distribution in a high yield by Ziegler polymerization using a specific titanium-containing solid catalyst component. Especially in case of polymerization of a monomer composed mainly of propylene, the present invention makes it possible to prepare a homopolymer or copolymer of propylene having a high rigidity and an excellent moldability under stable conditions industrially advantageously while reducing quantities of by-products.

2. Description of the Related Art

Many proposals have been made on solid catalyst components comprising titanium, magnesium and a halogen for preparing catalysts having a high activity and entailing little formation of by-products (see, for example, Japanese Examined Patent Publication No. 53-46799, Japanese Examined Patent Publication No. 56-16167, Japanese Unexamined Patent Publication No. 57-63310, Japanese Unexamined Patent Publication No. 58-32604 and Japanese Unexamined Patent Publication No. 60-130607), and according to these proposals, polyolefins having a high rigidity would be prepared at a high polymerization activity while entailing little formation of by-products, and the catalyst-removing step can be omitted and the preparation process can be simplified and rationalized. However, the molecular weight distribution of the polymer obtained would be narrower than that of the polymer obtained when the conventional titanium trichloride type catalyst is used, and therefore, the moldability would be impaired. Accordingly, improvements may be desired.

As the means for broadening the molecular weight distribution, there have been proposed treatment of catalyst components with heat or with a halogenating agent or an electron donor (see, for example, Japanese Unexamined Patent Publication No. 57-158204, Japanese Unexamined Patent Publication No. 59-56406, Japanese Unexamined Patent Publication No. 59-71309 and Japanese Unexamined Patent Publication No. 61-9406). However, the improving effect would be low and still insufficient, and the problems of reduction of the activity and increase of by-products may arise.

As another proposal, there can be mentioned the method in which the polymerization is continuously carried out in a plurality of reaction vessels or in multiple stages. A considerable improvement may be attained according to this method, but since a plurality of reaction vessels should be disposed, the problem of increase of the manufacturing cost arises. Therefore, development of a solid catalyst component capable of providing a polymer having a broad molecular weight distribution is desired.

SUMMARY OF THE INVENTION

It is a primary object of the present invention to make it possible to prepare a polyolefin having a broad molecular weight distribution at a low cost. The invention is based on the fact that research was made on solid catalyst components with a view to attaining this object, and as the result, it was found that the foregoing problems are effectively solved by using a solid catalyst component comprising specific subcomponents. The present invention has now been completed based on this finding.

More specifically, in accordance with the present invention, there is provided a titanium-containing solid catalyst component, component (A), which is a contact reaction product of:

(i) a magnesium halide,
(ii) a titanium compound represented by the formula:

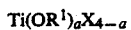

wherein a is a number of $0 \leq a \leq 4$, $R^1$ represents a hydrocarbyl group having 1 to 20 carbon atoms, and X represents a halogen atom, and (iii) a coordination titanium compound represented by the formula:

wherein $R^2$ represents a cyclopentadienyl group or a substituted cyclopentadienyl group, $R^3$ represents a hydrogen atom, a hydroxyl group, a hydrocarbyl group having 1 to 20 carbon atoms, an alkoxy group having 1 to 20 carbon atoms, an amino group or a substituted amino group, X represents a halogen atom, and m is a number of $1 \leq m \leq 4$ and n is a number of $0 \leq n \leq 3$, with the proviso that the condition of $1 \leq m+n \leq 4$ is satisfied.

Furthermore, in accordance with the present invention, there are provided a catalyst for the polymerization of α-olefins, which comprises the above-mentioned component (A) and an organoaluminum compound, component (B), and a process for the preparation of α-olefin polymers, which comprises polymerizing an α-olefin in the presence of the above-mentioned catalyst.

By using the titanium-containing solid catalyst component in combination with an organoaluminum component, a polyolefin having a high stereoregularity, a broad molecular weight distribution and an excellent moldability can be prepared at a high catalyst activity in a high yield at a low cost with formation of by-products being controlled.

Furthermore, according to the present invention, even if propylene is polymerized, the high stereoregularity is not reduced, and when the catalyst is used for the production of a block copolymer of propylene, quantities of by-products are small, the polymer particles are improved in stickiness and a block copolymer having an excellent moldability can be prepared.

DETAILED DESCRIPTION OF THE PREFERRED EMBODIMENTS

Solid Catalyst Component

The titanium-containing solid catalyst component of the present invention is a contact reaction product of subcomponents (i), (ii) and (iii). In the instant specification, it is not meant that the titanium-containing solid catalyst component should always consist solely of the above-mentioned subcomponents (i), (ii) and (iii), but in order to improve the stereoregularity, auxiliary subcomponents may further be included in the solid catalyst component, so far as attainment of the intended improving effect of the present invention is not inhibited.

Subcomponent (i)

The subcomponent (i) used in the present invention is a magnesium halide. Specific examples include magnesium dihalides such as $MgCl_2$, $MgBr_2$ and $MgI_2$, magnesium oxyhalides such as $(HO)MgCl$, alkoxy magnesium halides such as $(BuO)MgCl$ and $(EtO)MgCl$, alkyl magnesium halides such as EtMgCl, EtMgBr, n-BuMgCl, n-BuMgBr, BuMgI, sec-BuMgCl and tert-BuMgCl, and composite compounds obtained by treating $Mg(OEt)_2$, $Mg(OH)_2$, MgO, $(BuO)MgCl$ or BuMgCl with a known halogenating agent. As the composite compound, there can be mentioned a composite compound obtained by reacting $Mg(OEt)_2$ with $SiCl_4$, a composite compound obtained by heat-treating $Mg(OH)_2$ with $TiCl_4$, and a composite compound obtained by heat-treating MgO with $TiCl_4$. Among these magnesium halides, a magnesium dihalide and a magnesium composite compound in which the contained magnesium is substantially in the form of a magnesium dihalide are preferably used.

Subcomponent (ii)

The subcomponent (ii) is a titanium compound represented by the formula:

$$Ti(OR^1)_a X_{4-a}$$

wherein $R^1$ represents a hydrocarbyl group having 1 to 20 carbon atoms, preferably 1 to 10 carbon atoms, X represents a halogen atom, for example, a chlorine atom, and "a" is a number of $0 \leq a \leq 4$. Specific example of the subcomponent (ii) include: $TiCl_4$, $TiBr_4$, $Ti(OC_2H_5)Cl_3$, $Ti(OC_2H_5)_2Cl_2$, $Ti(OC_2H_5)_3Cl$, $Ti(O\text{---}iC_3H_7)Cl_3$, $Ti(O\text{---}nC_4H_9)Cl_3$, $Ti(O\text{---}nC_4H_9)_2Cl_2$, $Ti(OC_2H_5)Br_3$, $Ti(OC_2H_5)(OC_4H_9)_2Cl$, $Ti(O\text{---}nC_4H_9)_3Cl$, $Ti(O\text{---}C_6H_5)Cl_3$, $Ti(O\text{---}iC_4H_9)_2Cl_2$, $Ti(OC_3H_{11})Cl_3$, $Ti(OC_6H_{13})Cl_3$, $Ti(OC_2H_5)_4$, $Ti(O\text{---}nC_3H_7)_4$, $Ti(O\text{---}nC_4H_9)_4$, $Ti(O\text{---}iC_4H_9)_4$, $Ti(O\text{---}nC_6H_{13})_4$, $Ti(O\text{---}nC_8H_{17})_4$ and $Ti[OCH_2CH(C_2H_5)C_4H_9]_4$.

Furthermore, a molecular compound obtained by reacting $TiX'_4$ in which X' represents a halogen atom with an electron donor described hereinafter can be used as the subcomponent (ii). Specific examples include: $TiCl_4 \cdot CH_3COC_2H_5$, $TiCl_4 \cdot CH_3CO_2C_2H_5$, $TiCl_4 \cdot C_6H_5NO_2$, $TiCl_4 \cdot CH_3COCl$, $TiCl_4 \cdot C_6H_5COCl$, $TiCl_4 \cdot C_6H_5COCl$, $TiCl_4 \cdot C_6H_5CO_2C_2H_5$, $TiCl_4 \cdot ClCOC_2H_5$ and $TiCl_4 \cdot C_4H_4O$.

Among these titanium compounds, $TiCl_4$, $Ti(OEt)_4$, $Ti(OBu)_4$, especially $Ti(O\text{---}n\text{---}Bu)_4$, and $Ti(OBu)Cl_3$, especially $Ti(O\text{---}n\text{---}Bu)Cl_3$, are preferably used.

Subcomponent (iii)

The subcomponent (iii) is a coordination titanium compound represented by the formula:

$$R^2{}_m R^3{}_n TiX_{4-m-n}$$

wherein $R^2$ represents a cyclopentadienyl group or a substituted cyclopentadienyl group, $R^3$ represents a hydrogen atom, a hydroxyl group, a hydrocarbyl group having 1 to 20, preferably 1 to 10, carbon atoms, an alkoxy group having 1 to 20, preferably 1 to 10, carbon atoms, an amino group or a substituted amino group, X represents a halogen atom, for example, a chlorine atom, and m is a number of $1 \leq m \leq 4$ and n is a number of $0 \leq n \leq 3$, with the proviso that the condition of $1 \leq m+n \leq 4$ is satisfied.

As the substituted cyclopentadienyl group, there can be mentioned those having a monovalent substituent such as a lower alkyl group or a halogen atom to a cyclopentadienyl group, and those having a divalent substituent to a cyclopentadienyl group. As an example of the latter group, there can be mentioned those having a benzene ring fused with a cyclopentadienyl group, that is, an indenyl group.

As the group $R^2$, a cyclopentadienyl group, a lower alkyl-substituted cyclopentadienyl group and an indenyl group are preferable, and a cyclopentadienyl group is especially preferable. A lower alkyl group, especially a methyl group, is preferable as the group $R^3$. A chlorine atom is preferable as X, and it is preferred that m be 2.

Specific examples of the subcomponent (iii) include: bis(cyclopentadienyl)titanium monochloride hydride, bis(cyclopentadienyl)titanium monobromide monohydride, bis(cyclopentadienyl)titanium dichloride, bis(cyclopentadienyl)titanium dibromide, bis(cyclopentadienyl)titanium methylchloride, bis(cyclopentadienyl)titanium ethylchloride, bis(cyclopentadienyl)titanium phenylchloride, bis(cyclopentadienyl)titanium methylhydride, bis(cyclopentadienyl)titanium ethylhydride, bis(cyclopentadienyl)titanium phenylhydride, bis(cyclopentadienyl)titanium dihydride, bis(cyclopentadienyl)titanium methylbutoxide, bis(cyclopentadienyl)titanium butoxychloride, bis(cyclopentadienyl)titanium hydroxychloride, bis(cyclopentadienyl)titanium diethylaminochloride, bis(methylcyclopentadienyl)titanium dichloride, bis(1,2-dimethylcyclopentadienyl)titanium dichloride, bis(pentamethylcyclopentadienyl)titanium dichloride, bis(indenyl)titanium dichloride, ethylene-bisindenyltitanium dichloride, cyclopentadienyltitanium trichloride, cyclopentadienyltitanium methyldichloride, cyclopentadienyltitanium ethyldichloride, cyclopentadienylindenyltitanium dichloride, cyclopentadienyltitanium trimethyl, cyclopentadienyltitanium triphenyl and cyclopentadienyltitanium dimethylhydride. Among these, bis(cyclopentadienyl) titanium dichloride, bis(indenyl)titanium dichloride and bis(cyclopentadienyl)titanium chloride hydride are preferred.

The amount used of the subcomponent (iii) is not particularly critical, but the amount of the subcomponent (iii) is generally 0.01 to 1,000 moles, preferably 0.1 to 100 moles, per mole of the titanium compound as the subcomponent (ii).

In addition to the above-mentioned indispensable subcomponents, the titanium-containing solid catalyst component of the present invention can further comprise a silicon compound such as silicon halides or organosilicon halides, e.g. $SiCl_4$ or $CH_3SiCl_3$, a polymeric silicone compound having a formula

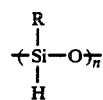

wherein R is a hydrocarbyl group of 1 to 10, preferably 1 to 6, carbon atoms and n is a degree of polymerization such that its viscosity is 1 to 100 centistokes, such as methylhydrogen polysiloxane, an aluminum compound such as $Al(O\text{---}i\text{---}C_3H_7)$, $AlCl_3$, $AlBr_3$, $Al(OC_2H_5)_3$ or Al(OCH$_3$)$_2$Cl, and a boron compound such as B(OC$_6$H$_5$)$_3$. It is permissible that these compounds may be left as the silicon, aluminum and boron in the titanium-containing solid catalyst component.

When this titanium-containing solid catalyst component is prepared, an electron donor can be used as the inside donor.

As the electron donor (inside donor) that can be used for the preparation of the titanium-containing solid catalyst component, there can be mentioned oxygen-containing electron donors such as alcohols, phenols, ketones, aldehydes, carboxylic acids, organic acid and inorganic acid esters, ethers, acid amides and acid anhydrides, nitrogen-containing electron donors such as ammonia, amines, nitriles and isocyanates.

More specifically, there can be mentioned (a) alcohols having 1 to 18 carbon atoms, such as methanol, ethanol, propanol, pentanol, hexanol, octanol, dodecanol, octadecyl alcohol, benzyl alcohol, phenylethyl alcohol, cumyl alcohol and isopropylbenzylalcohol; (b) phenols having 6 to 25 carbon atoms, which can have an alkyl substituent, such as phenol, cresol, xylenol, ethylphenol, propylphenol, cumylphenol, nonylphenol and naphthol; (c) ketones having 3 to 15 carbon atoms, such as acetone, methylethylketone, methylisobutylketone, acetophenone and benzophenone; (d) aldehydes having 2 to 15 carbon atoms, such as acetaldehyde, propionaldehyde, octylaldehyde, benzaldehyde, tolualdehyde and naphthoaldehyde; (e) esters of organic acids having 2 to 20 carbon atoms, the alcohol moiety being of 1 to 20 carbon atoms, such as methyl formate, methyl acetate, ethyl acetate, vinyl acetate, ethylcellosolve acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, ethyl cyclohexanecarboxylate, methyl benzoate, ethyl benzoate, ethylcellosolve benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, diethyl phthalate, dibutyl phthalate, diheptyl phthalate, γ-butyrolactone, α-valerolactone, cumarine, phthalide and ethylene carbonate; (f) inorganic acid esters, the alcohol moiety having 1 to 10 carbon atoms, such as ethyl silicate, butyl silicate, methyl borate, ethyl borate, butyl borate, phenyl boyate, triethyl phosphite, tributyl phosphite and butyl phosphate; (g) acid halides having 2 to 15 carbon atoms such as acetyl chloride, benzoyl chloride, toluic acid chloride, anisic acid chloride, phthaloyl chloride and isophthaloyl chloride; (h) ethers having 2 to 20 carbon atoms, such as methyl ether, ethyl ether, isopropyl ether, butyl ether, amyl ether, tetrahydrofuran, anisole and diphenyl ether; (i) acid amides such as acetic acid amide, benzoic acid amide and toluic acid amide; (j) amines such as methylamine, ethylamine, diethylamine, tributylamine, piperidine, tribenzylamine, aniline, pyridine, picoline and tetramethylethylenediamine; (k) nitriles such as acetonitrile, benzonitrile and tolunitrile; and (1) organic alkoxysilicon compounds such as phenyltriethoxysilane, diphenyldimethoxysilane, dimethyldimethoxysilane, isobutyltrimethoxysilane, tertbutyltrimethoxysilane, tert-butylmethyldimethoxysilane and cumyltrimethoxysilane. These electron donors can be used in the form of mixtures of two or more of them. Among these electron donors, organic acid esters, acid halides, inorganic acid esters and organic alkoxy silicon compounds are preferably used, and ethylcellosolve acetate, phthalic acid esters, phthalic acid halides and tert-butylmethyldimethoxysilane are especially preferably used.

When the titanium-containing solid catalyst component of the present invention is prepared, an organic compound of a metal of Group I, II or III of the Periodic Table, having a reducing property, can be made present in the reaction mixture. In this case, the subcomponents (ii) and (iii) are modified so that the titanium is reduced to trivalent or divalent state and their structures are changed. So far as the subcomponents (ii) and (iii) are used at any of the stages, the preparation process is included within the scope of the present invention.

As the organic compound of the metal of Group I, II or III of the Periodic Table having a reducing property, there can be mentioned organolithium compounds such as methyllithium and butyllithium, organomagnesium compounds such as dibutylmagnesium, butylethylmagnesium, hexylethylmagnesium, butylmagnesium chloride and ethylmagnesium bromide, organozinc compounds such as diethylzinc and di-n-butylzinc, and organoaluminum compounds such as trimethylaluminum, triethylaluminum, tri-n-propylaluminum, tri-n-butylaluminum, triisobutylaluminum, diethylaluminum chloride, diethylaluminum hydride, ethylaluminum sesquichloride, ethylaluminum dichloride, dimethylaluminum chloride, diethylaluminum ethoxide, methylaluminoxane and tetraisobutylaluminoxane. Among these organometal compounds, organoaluminum compounds are preferably used.

The amounts used of the subcomponents (i), (ii) and (iii) and optional subcomponents are not particularly critical, so far as the intended effects of the present invention are attained, but in general, the following amounts are preferable.

The amount used of the titanium compound as the subcomponent (ii) is preferably such that the molar ratio to the magnesium halide (i) is $1 \times 10^{-4}$ to 1,000, preferably 0.01 to 10. The amount of the titanium compound as the subcomponent (iii) is preferably such that the molar ratio to the magnesium halide (i) is $1 \times 10^{-4}$ to 1,000, especially 0.01 to 10. The amount used of the silicon, aluminum or boron compound as the additional subcomponent is preferably such that the molar ratio to the magnesium compound (i) is $1 \times 10^{-3}$ to 100, preferably 0.01 to 1. The amount used of the electron donor compound is preferably such that the molar ratio to the magnesium compound (i) is $1 \times 10^{-3}$ to 10, preferably 0.01 to 5.

The amount used of the reducing organic compound of the metal of Group I, II or III of the Periodic Table is preferably such that the molar ratio to the sum of the titanium compounds (ii) and (iii) is $1 \times 10^{-4}$ to 1,000, preferably 0.01 to 100.

The solid catalyst component of the present invention can be prepared, for example, according to the method in which all of the subcomponents (i), (ii) and (iii) are simultaneously contacted with one another, the method in which a solid component formed by contacting the subcomponents (i) and (ii) in advance is treated with the subcomponent (iii), the method in which a solid component obtained by contacting the subcomponents (i) and (iii) in advance is treated with the subcomponent (ii), and the method in which the subcomponent (ii) is contacted with the subcomponent (iii) in advance and the contact product is then contacted with the subcomponent (i). As the solid component obtained by contacting the subcomponents (i) and (ii), known solid components can be used. For example, there can be used solid components disclosed in Japanese Unexamined Patent Publication No. 53-45686, No. 54-3894, No. 54-31092, No. 54-39483, No. 54-94591, No. 54-118484, No. 54-131589, No. 55-75411, No. 55-90510, No. 55-90511, No. 55-127405, No. 55-147507, No. 55-155003, No. 56-18609, No. 56-70005, No. 56-72001, No. 56-86905, No. 56-90807, No. 56-155206, No. 57-3803, No. 57-34103, No. 57-92007, No. 57-121003, No. 58-5309, No. 58-5310, No. 58-8706, No. 58-27732, No. 58-32604, No. 58-32605, No. 58-67703, No. 58-117206, No. 58-127708, No. 58-183708, No. 58-183709, No. 59-149905 and No. 59-149906.

More specifically, the following preparation methods can be adopted.

(a) A magnesium halide, a titanium compound and a coordination titanium compound, if necessary together with an electron donor, are co-pulverized.

(b) Alumina or magnesia is treated with a phosphorus halide compound, and the treated product is contacted with a magnesium halide, an electron donor, a halogen-containing titanium compound and a coordination titanium compound.

(c) A magnesium halide is contacted with a titanium tetra-alkoxide and a specific polymeric silicon compound, and the obtained solid component is contacted with a titanium halide compound and a coordination titanium compound and/or a halogen compound of silicon.

Preferable examples of the polymeric silicone compound include a compound represented by the formula:

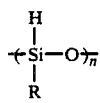

wherein R represents a hydrocarbyl group having 1 to about 10 carbon atoms, preferably a lower alkyl group, and n represents a degree of polymerization giving a viscosity of about 1 to 100 cSt to the polymeric silicone compound.

Specific examples include: methylhydrogen polysiloxane, 1,3,5,7-tetramethylcyclotetrasiloxane, 1,3,5,7,9-pentamethylcyclopentasiloxane, ethylhydrogen polysiloxane, phenylhydrogen polysiloxane and cyclohexylhydrogen polysiloxane.

(d) A magnesium compound is dissolved in a titanium tetraalkoxide and an electron donor, and a solid component is then precipitated from the solution with a halogenating agent or a halogen-containing titanium compound. Then, the solid component is contacted with a coordination titanium compound.

(e) An organomagnesium compound such as a Grignard reagent is reacted with a halogenating agent and a reducing agent, and the reaction product is contacted with a titanium compound and a coordination titanium compound, if necessary together with an electron donor.

(f) An alkoxy magnesium compound is contacted with a halogenating agent and/or a titanium compound in the presence or absence of an electron donor, and the contact product is then contacted with a coordination titanium compound.

The solid catalyst component obtained according to the above-mentioned method is combined with the organoaluminum compound as the component (B) and used for the homopolymerization or copolymerization of α-olefins. Prior to the polymerization, a small amount of a polymer can be formed in advance by polymerization of a monomer, the preliminary polymerization. In general, a monomer is preliminarily polymerized in an amount of about 0.01 to about 100 g per gram of the solid catalyst component. The preliminary polymerization temperature is not particularly critical, but in general, the preliminary polymerization is carried out at a temperature of $-20°$ to $70°$ C. The preliminary polymerization is performed in the presence of an organic compound of a metal of Group I, II or III of the Periodic Table or by using the solid catalyst component treated with this organometal compound in advance.

As the monomer used for the preliminary polymerization, there can be mentioned α-olefins and dienes such as ethylene, propylene, 1-butene, 1-hexene, 1-octene, butadiene, 1,4-hexadiene, 1,5-hexadiene, 4-methylpentene-1, 3-methylbutene-1, 1,6-heptadiene, 1,9-decadiene and 4,4-dimethyl-pentene-1, cyclic monomers such as norbornene, cyclopentene, dicyclopentadiene and ethylidenenorbornene, acetylenes such as acetylene, butylacetylene and phenylacetylene, and vinyl aromatic hydrocarbons such as styrene, p-methylstyrene and divinylbenzene. Two or more of these monomers may be used stepwise or in the form of a mixture.

The preliminary polymerization is generally carried out in an inert solvent. However, the preliminary polymerization can be performed in a liquid monomer or gaseous monomer. Hydrogen can be used in the polymerization system for controlling the molecular weight.

Polymerization Process

The above-mentioned solid catalyst component is combined with the organoaluminum compound as the component (B) and used for the homopolymerization or copolymerization.

The component (B) is an organoaluminum compound. Preferable are compounds represented by the following formula:

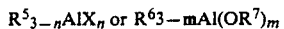

wherein $R^5$ and $R^6$ each represent a hydrocarbyl group having 1 to about 20 carbon atoms or a hydrogen atom, $R^7$ represents a $C_1-C_{20}$ a hydrocarbyl group which may be the same as or different from $R^6$, X represents a halogen atom, n is a number of $0 \leq n < 3$, and m is a number of $0 < m < 3$.

Specific examples include: (a) trialkylaluminums such as trimethylaluminum, triethylaluminum, triisobutylaluminum, trihexylaluminum, trioctylaluminum and tridecylaluminum, (b) alkylaluminum halides such as diethylaluminum monochloride, diisobutylaluminum monochloride, ethylaluminum sesquichloride and ethylaluminum dichloride, (c) alkylaluminum hydrides such as diethylaluminum hydride and diisobutylaluminum hydride, (d) aluminum alkoxides such as diethylaluminum ethoxide and diethylaluminum phenoxide, and (e) alumoxanes such as methylalumoxane and tetraisobutylalumoxane.

Another organometal compound, such as, for example, an alkylaluminum alkoxide represented by the formula:

$$R^8{}_{3-a}Al(OR^9)_a$$

wherein "a" is a number of $1 \leq a < 3$, and $R^8$ and $R^9$, which may be the same or different, represent a hydrocarbyl group having 1 to about 20 carbon atoms, can be used in combination with the foregoing organoaluminum compounds (a) through (e). Specific examples include a combination of triethylaluminum and diethylaluminum ethoxide, a combination of diethylaluminum monochloride and diethylaluminum ethoxide, a combination of ethylaluminum dichloride and ethylaluminum diethoxide, and a combination of triethylaluminum and diethylaluminum chloride.

The amount used of the component (B) is such that the component (B)/component (A) weight ratio is from 0.1 to 1,000, preferably from 1 to 100.

Polymerization

The catalyst of the present invention can be applied not only to the conventional slurry polymerization but also to a liquid phase solvent-free polymerization wherein substantially no solvent is used, a solution polymerization or a gas phase polymerization. The catalyst of the present invention can be applied to the continuous polymerization, the batchwise polymerization and the polymerization comprising the preliminary polymerization step. In case of the slurry polymerization, saturated aliphatic and aromatic hydrocarbons such as hexane, heptane, pentane, cyclohexane, benzene or toluene can be used as the polymerization solvent. These solvents can be used singly or in the form of a mixture of two or more of them. The polymerization temperature is from room temperature to about 200° C., preferably from 50° to 150° C. Hydrogen can be auxiliarily used as a molecular weight-adjusting agent. The polymerization pressure is generally from atmospheric pressure to 50 kg/cm²G.

The olefin to be polymerized by the catalyst system of the present invention is an α-olefin represented by the formula:

$$R-CH=CH_2$$

wherein R represents a hydrogen atom or a hydrocarbyl group having 1 to 10 carbon atoms, which may be straight or branched.

Specific examples include olefins such as ethylene, propylene, butene-1, pentene-1, hexene-1 and 4-methylpentene-1. Ethylene and propylene are preferable. Ethylene can be copolymerized with another olefin as mentioned above in an amount of up to 50% by weight, preferably up to 20% by weight, and propylene can be copolymerized with another olefin as mentioned above, especially ethylene, in an amount of up to 30% by weight. Furthermore, copolymerization with another copolymerizable monomer such as, for example, vinyl acetate or a diolefin, can be performed.

The present invention will now be described in detail with reference to the following examples that by no means limit the scope of the invention.

EXAMPLE 1

Preparation of Solid Catalyst Component (A)

In a flask, the inner atmosphere of which had been substituted with nitrogen, 200 ml of n-heptane, from which water and oxygen had been removed, was introduced, and then, 0.4 mole of $MgCl_2$ and 0.8 mole of $Ti(O-nC_4H_9)_4$ were introduced into the flask and reaction was carried out at 95° C. for 2 hours. After the reaction, the temperature was lowered to 40° C. and 48 ml of methylhydrogen polysiloxane having a viscosity of 20 cSt was introduced into the flask, and reaction was conducted for 3 hours. The solid component formed was washed with n-heptane.

In a flask, the inner atmosphere of which had been sufficiently substituted with nitrogen, 50 ml of n-heptane purified in the same manner as described above was introduced, and the solid catalyst component synthesized above was introduced into the flask in an amount of 0.24 mole as calculated as the Mg atom. Then, a mixture of 25 ml of n-heptane and 0.4 mole of $SiCl_4$ was introduced in the flask at 30° C. over a period of 30 minutes and reaction was carried out at 70° C. for 3 hours. After the reaction, the reaction product was washed with n-heptane. Then a mixture of 25 ml of n-heptane and 0.024 mole of phthalic acid chloride was introduced at 70° C. over a period of 30 minutes and reaction was carried out at 90° C. for 1 hour.

After the reaction, the reaction product was washed with n-heptane. Then, 20 ml of $SiCl_4$ was introduced into the flask and reaction was carried out at 80° C. for 6 hours. After the reaction, the reaction product was amply washed with n-heptane. It was found that the titanium content of the reaction product was 1.21% by weight.

In a flask, the inner atmosphere of which had been substituted with nitrogen, 50 ml of amply purified n-heptane was introduced, and 5 g of the reaction product obtained above was introduced into the flask and 1.6 ml of $(CH_3)_3CSi(CH_3)(OCH_3)_3$ was then introduced. Then, 0.52 ml of $Cp_2TiCl_2$, namely bis(cyclopentadienyl)titanium dichloride, was introduced into the flask and 3.0 g of triethylaluminum was further incorporated. Contact reaction was conducted at 30° C. for 2 hours. After the contact reaction, the reaction product was amply washed with n-heptane to give a titanium-containing solid catalyst component (A). It was found that the titanium content in the solid component (A) was 1.68% by weight.

Polymerization of Propylene

The inner atmosphere of an autoclave equipped with a stirrer having an inner volume of 1.5 lit. was amply substituted with propylene, and 500 ml of n-heptane, from which water and oxygen had been amply removed, was introduced into the autoclave. Then, 15 mg of the above-mentioned titanium-containing solid catalyst component (A) and 125 mg of triethylaluminum were introduced in a propylene atmosphere. Then, 500 ml of hydrogen was introduced into the autoclave and the temperature was elevated to 75° C., and the pressure of propylene was elevated to 5 kg/cm²G and polymerization was carried out for 2 hours.

After the polymerization, the obtained polymer slurry was filtered, and the separated polymer was dried.

As the result, 194.3 g of a polymer was obtained. Furthermore, 0.86 g of a polymer was recovered from the filtrate. Accordingly, the activity of the catalyst was 13,100 g-polymer/g-solid catalyst component (g-PP/g-solid component). The polymer obtained had MFR of 2.7 g/10 min and a bulk density of 0.46 g/cc. In order to determine the molecular weight distribution, the Mw/Mn ratio was measured by GPC and the ME value was measured by the method described below. It was found that the Mw/Mn ratio was 7.8 and the ME value was 1.60.

For the measurement of the ME value, an MFR meter was used, and a sample was extruded at 190° C. under a load from an orifice having a diameter of 1.0 mm through a length of 8.0 mm. The polymer extruded from the orifice at an extrusion speed of 0.1 g/min was thrown into methanol and rapidly cooled, and the diameter of the formed strand was measured. The ME value was expressed as the ratio of the diameter of the strand to the diameter of the orifice.

EXAMPLE 2

Preparation of Solid Catalyst Component (A)

In a flask, the inner atmosphere of which had been substituted with nitrogen, 200 ml of n-heptane, from which water and oxygen had been removed, was introduced, and 0.4 mole of $MgCl_2$ and 0.8 mole of $Ti(O-n-C_4H_9)_4$ were introduced into the flask and reaction was carried out at 95° C. for 2 hours. After the reaction, the temperature was lowered to 40° C., and 48 ml of methylhydrogen polysiloxane having a viscosity of 20 cSt was introduced into the flask and reaction was carried out for 3 hours. The solid component formed was washed with n-heptane.

Into a flask, the inner atmosphere of which had been amply substituted with nitrogen, 50 ml of n-heptane purified in the above-mentioned manner was introduced, and the solid component prepared above was introduced into the flask in an amount of 0.24 mole as calculated as the Mg atom. A mixture of 25 ml of n-heptane and 0.4 mole of $SiCl_4$ was introduced into the flask at 30° C. over a period of 30 minutes, and reaction was carried out at 70° C. for 3 hours. After the reaction, the reaction product was washed with n-heptane. Then, a mixture of 25 ml of n-heptane and 0.024 mole of phthalic acid chloride was introduced into the flask at 70° C. over a period of 30 minutes, and reaction was carried out at 90° C. for 1 hour.

After the reaction, the reaction product was washed with n-heptane, and 4.8 g of tungsten hexachloride was introduced into the flask and reaction was carried out at 95° C. for 3 hours. After the reaction, the reaction product was amply washed with n-heptane to give a reaction product having a titanium content of 0.74% by weight.

Into a flask was introduced 5 g of the reaction product obtained above, and 0.5 ml of $(CH_3)_3CSi(CH_3)(OCH_3)_2$ was introduced into the flask and 0.2 g of $Cp_2TiCl_2$ was then introduced into the flask. Furthermore, 2.0 g of triethylaluminum was introduced into the flask and contact reaction was carried out at 30° C. for 2 hours. After the contact reaction, the reaction product was amply washed with n-heptane to give a titanium-containing solid catalyst component (A). It was found that the titanium content in the solid catalyst component (A) was 0.82% by weight.

Polymerization of Propylene

Polymerization of propylene was carried out under the same conditions as described in Example 1 except that 15 mg of the solid catalyst component (A) prepared above was used.

As the result, 163.5 g of a polymer was obtained, and 0.70 g of a polymer was recovered from the filtrate. Accordingly, the activity of the catalyst was 10,900 g-polymer/g-solid catalyst component. It was found that the polymer had MFR of 3.8 g/10 min, a bulk density of 0.45 g/cc, an Mw/Mn ratio of 8.1 and an ME value of 1.56.

COMPARATIVE EXAMPLE 1

Solid Catalyst Component (A)

A solid catalyst component (A) was prepared under the same conditions as described in Example 2 except that $Cp_2TiCl_2$ used as the subcomponent (ii) in Example 2 was not used. The obtained solid catalyst component (A) contained 0.66% by weight of titanium.

Polymerization of Propylene

Polymerization was carried out under the same conditions as described in Example 1 except that 15 mg of the solid catalyst component (A) obtained above was used. The obtained results are shown in Table 1.

COMPARATIVE EXAMPLE 2

Polymerization was carried out under the same conditions as described in Comparative Example 1 except that the amount of hydrogen used for the polymerization was changed to 40 ml. The obtained results are shown in Table 1.

As is apparent from the results shown in Table 1, the Mw/Mn ratios and ME values of the polymers obtained in Comparative Examples 1 and 2 were smaller than those of the polymer obtained in Example 1, and the polymers obtained in Comparative Examples 1 and 2 had a narrow molecular weight distribution and had poor moldability.

EXAMPLE 3

Preparation of Solid Catalyst Component (A)

A solid catalyst component (A) was prepared in the same manner as described in Example 2 except that 1 g of bis(cyclopentadienyl)titanium dichloride was added together with 4.8 g of tungsten hexachloride and then, reaction was carried out at 95° C. for 3 hours. After the reaction, the reaction product was amply washed with n-heptane to give a solid catalyst component (A) having a titanium content of 1.42% by weight.

Polymerization of Propylene

The inner atmosphere of an autoclave equipped with a stirrer having an inner volume of 1.5 lit. was amply substituted with propylene, and 500 ml of n-heptane, from which water and oxygen had been amply removed, was introduced into the autoclave. Then, 15 mg of the solid catalyst component (A) prepared above, 125 mg of triethylaluminum and 26.8 mg of diphenyldimethoxysilane were introduced in a propylene atmosphere, and 300 ml of hydrogen was further introduced. Then, the temperature was elevated to 75° C. and polymerization was carried out for 2 hours. The results obtained are shown in Table 1.

EXAMPLES 5 THROUGH 9 AND COMPARATIVE EXAMPLE 3

Synthesis of a solid catalyst component (A) and polymerization of propylene were carried out under the same conditions as described in Example 2 except that titanocene compounds shown in Table 2 were used as the subcomponent (iii) instead of bis(cyclopentadienyl)titanium dichloride. The obtained results are shown in Table 2.

EXAMPLE 10

The inner atmosphere of an autoclave of the agitation type having an inner volume of 1.5 lit. was amply substituted with propylene, and 500 ml of n-heptane, from which water and oxygen had been amply removed, was introduced into the autoclave. Then, 20 mg of the solid catalyst component (A) obtained in Example 1 and 125 mg of triethylaluminum were introduced in a propylene atmosphere.

Then, 200 ml of hydrogen was introduced into the autoclave and the temperature was maintained at 75° C., and propylene was introduced at a constant rate of 0.917 g/min. After 3 hours, the introduction of propylene was stopped and polymerization was continued at 75° C. When the pressure became 2 kg/cm$^2$G, 1/10 of the formed polymer was collected as an intermediate sample. Furthermore, the gas phase portion was purged until the pressure was reduced to 0.2 kg/cm$^2$G, and then, propylene and ethylene were introduced at constant rates of 0.133 g/min and 0.200 g/min, respectively, at a temperature of 65° C. for 1.5 hours. After the introduction, polymerization was continued, and when the pressure was reduced to 1.0 kg/cm$^2$G, the gas phase portion was purged and the polymerization was stopped. The slurry was filtered and the recovered solid was dried to give 165.2 g of a polymer. When the filtrate was dried, 3.70 g of a less crystalline polymer was obtained as a by-product. The polymer formed had MFR of 4.55 g/10 min and a bulk density of 0.477 g/cc. The polymer obtained by drying the intermediate sample had MFR of 18.7 g/10 cc. The angle of repose of the polymer was 31.7°. The yield of the polymer was 9,400 g-polymer/g-solid catalyst component. The ME value was 1.43.

Additives described below were incorporated into the obtained polymer, and the composition was pelletized by an extruder.

Additives

| | |
|---|---|
| 2,6-di-tert-butylphenol | 0.10% by weight |
| PA1010 (supplied by Ciba-Geigy) | 0.05% by weight |
| calcium stearate | 0.10% by weight |
| PTBBA-Al (supplied by Shell Chemical) | 0.10% by weight |

The obtained pellet was subjected to the spiral flow measurement under the following conditions by using an injection molding machine of the SJ type (in-line screw type). It was found that the spiral flow was 800 mm.

Molding temperature: 240° C.
Injection pressure: 800 kg/cm$^2$
Injection time: 6 seconds
Mold temperature: 40° C.
Injection rate: 50 g/sec

COMPARATIVE EXAMPLE 4

Copolymerization of Propylene

Polymerization was carried out under the same conditions as adopted in Example 10 except that 20 mg of the solid catalyst component (A) used in Comparative Example 1 was used. The polymer obtained was evaluated in the same manner as described in Example 10. The results obtained are shown in Table 3.

From the results obtained in Example 10 and Comparative Example 4, it is seen that according to the present invention, the ME value of the obtained polymer is increased and the spiral flow (as a criterion of the flowability) is excellent.

TABLE 1

| | Activity (g-PP/g-solid component) | Atactic Ratio (% by weight) | MFR (g/10 min.) | Bulk Density (g/cc) | GPC Mw × 10$^4$ | GPC Mw/Wn | M.E. |
|---|---|---|---|---|---|---|---|
| Example 1 | 13,100 | 0.44 | 2.7 | 0.46 | 40.6 | 7.8 | 1.60 |
| Example 2 | 10,900 | 0.43 | 3.8 | 0.45 | 37.1 | 8.1 | 1.56 |
| Comparative Example 1 | 12,400 | 1.1 | 17.6 | 0.43 | 21.2 | 4.4 | 1.20 |
| Comparative Example 2 | 11,200 | 0.35 | 1.8 | 0.46 | 44.8 | 5.0 | 1.42 |
| Example 3 | 11,100 | 0.33 | 2.1 | 0.45 | 42.7 | 7.6 | 1.58 |

TABLE 2

| | Subcomponent (iii) Kind | Subcomponent (iii) Amount (g) | Titanium Content (% by weight) | Activity (g-PP/g-solid component) | Atactic Ratio (% by weight) | MFR (g/10 min.) | Bulk Density (g/cc) | GPC Mw × 10$^4$ | GPC Mw/Wn | M.E. |
|---|---|---|---|---|---|---|---|---|---|---|
| Example 2 | Cp$_2$TiCl$_2$ | 0.2 | 0.82 | 10,900 | 0.43 | 3.8 | 0.45 | 37.1 | 8.1 | 1.56 |
| Example 5 | Cp$_2$TiCl$_2$ | 0.5 | 1.02 | 9,500 | 0.70 | 0.9 | 0.43 | 48.3 | 8.3 | 1.60 |
| Example 6 | Cp$_2$TiMe$_2$ | 0.2 | 0.77 | 10,000 | 0.33 | 2.7 | 0.46 | 42.1 | 7.8 | 1.57 |
| Example 7 | (CH$_3$Cp)$_2$TiMe$_2$ | 0.3 | 0.80 | 10,200 | 0.37 | 3.1 | 0.46 | 41.7 | 7.8 | 1.56 |
| Example 8 | [(CH$_3$)$_5$Cp]$_2$TiCl$_2$ | 0.3 | 0.78 | 11,500 | 0.50 | 3.2 | 0.47 | 41.2 | 8.0 | 1.57 |
| Example 9 | Ethylene-bis-indenyltitanium dichloride | 0.5 | 0.95 | 9,200 | 0.71 | 4.8 | 0.45 | 33.8 | 7.5 | 1.50 |
| Comparative Example 3 | Cp$_2$ZrCl$_2$ | 0.30 | 0.70 | 9,900 | 0.51 | 7.3 | 0.45 | 29.7 | 5.0 | 1.32 |

Note
Cp$_2$: biscyclopentadienyl group
(CH$_3$)$_n$Cp$_2$: Cp$_2$ substituted with n of methyl groups

TABLE 3

| | Activity (g-PP/g-catalyst) | Atactic Ratio (% by weight) | MFR (g/10 min.) former stage/latter stage | Bulk Density (g/cc) | Angle (°) of Repose | M.E. | Spiral Flow (mm) |
|---|---|---|---|---|---|---|---|
| Example 10 | 9,400 | 2.19 | 18.7/4.55 | 0.477 | 31.7 | 1.43 | 800 |
| Comparative Example 4 | 9,600 | 2.78 | 22.3/9.33 | 0.468 | 32.0 | 1.20 | 720 |

We claim:

1. A catalyst for the polymerization of α-olefins, which comprises:
   (A) a titanium-containing solid catalyst component which is a contact reaction product of:
   (i) a magnesium halide,
   (ii) a titanium compound represented by the formula:

$$Ti(OR^1)_a X_{4-a}$$

wherein a is a number of $0 \leq a \leq 4$, $R^1$ represents a hydrocarbyl group having 1 to 20 carbon atoms, and X represents a halogen atom, and
   (iii) a coordination titanium compound represented by the formula:

$$R^2_m R^3_n Ti X_{4-m-n}$$

wherein $R^2$ represents a cyclopentadienyl group or a lower alkyl-substituted cyclopentadienyl group or an indenyl group, $R^3$ represents a lower alkyl group, X represents a halogen atom, and m is a number of $1 \leq m \leq 4$ and n is a number of $0 \leq n \leq 3$, with the proviso that the condition of $1 \leq m+n \leq 4$ is satisfied, the contact reaction product being washed with an inert solvent, and
   (B) an organoaluminum compound.

2. A titanium-containing solid catalyst component as set forth in claim 1, wherein the subcomponent (i)/subcomponent (ii)/subcomponent (iii) molar ratio is $1/(1 \times 10^{-4} \text{ to } 1,000)/(1 \times 10^{-4} \text{ to } 1,000)$.

3. A titanium-containing solid catalyst component as set forth in claim 1, wherein the subcomponent (i)/subcomponent (ii)/subcomponent (iii) molar ratio is $1/(0.01 \text{ to } 10)/(0.01 \text{ to } 10)$.

4. A titanium-containing solid catalyst component as set forth in claim 1, wherein the subcomponent (i) is selected from the group consisting of magnesium dihalides and composite magnesium compounds in which the magnesium comprised therein is substantially in the form of a magnesium dihalide.

5. A titanium-containing solid catalyst component as set forth in claim 1, wherein the subcomponent (ii) is selected from the group consisting of titanium tetrachloride, tetraethoxytitanium, tetrabutoxytitanium and butoxytitanium trichloride.

6. A titanium-containing solid catalyst component as set forth in claim 1, wherein the subcomponent (iii) is selected from the group consisting of bis(cyclopentadienyl) titanium dichloride, bis(indenyl)titanium dichloride and bis(cyclopentadienyl)titanium chloride hydride.

7. A titanium-containing solid catalyst component as set forth in claim 1, which further comprises a polymeric silicone compound represented by the following formula:

$$\left(\!\!\begin{array}{c} H \\ | \\ Si - O \\ | \\ R \end{array}\!\!\right)_{\!\!n}$$

wherein R represents a hydrocarbyl group having 1 to about 10 carbon atoms, and n represents a degree of polymerization giving a viscosity of about 1 to about 100 cSt to the polymeric silicone compound.

8. A titanium-containing solid catalyst component as set forth in claim 1, which further comprises an electron donor compound selected from the group consisting of organic acid esters, acid halides, inorganic acid esters and organic alkoxy silicone compounds.

9. A titanium-containing solid catalyst component as set forth in claim 1, which has been prepared through the preliminary polymerization comprising contacting an α-olefin with the titanium-containing solid catalyst component at a temperature of $-20°$ to $70°$ C. to polymerize the α-olefin in an amount of about 0.01 to about 100 g per gram of the solid catalyst component.

* * * * *